(12) United States Patent
Asokan et al.

(10) Patent No.: US 10,564,877 B1
(45) Date of Patent: Feb. 18, 2020

(54) METHODS AND APPARATUS TO STORE AND ENABLE A TRANSFER PROTOCOL FOR NEW FILE FORMATS FOR DISTRIBUTED PROCESSING AND PRESERVE DATA INTEGRITY THROUGH DISTRIBUTED STORAGE BLOCKS

(71) Applicant: Syncsort Incorporated, Pearl River, NY (US)

(72) Inventors: Mariappan Asokan, Millburn, NJ (US); Ban Tran, West Caldwell, NJ (US)

(73) Assignee: Syncsort Incorporated, Pearl River, NY (US)

( * ) Notice: Subject to any disclaimer, the term of this patent is extended or adjusted under 35 U.S.C. 154(b) by 2 days.

(21) Appl. No.: 15/988,669

(22) Filed: May 24, 2018

Related U.S. Application Data

(60) Provisional application No. 62/510,577, filed on May 24, 2017.

(51) Int. Cl.
  *G06F 3/06* (2006.01)
  *G06F 9/448* (2018.01)
  *G06F 16/182* (2019.01)

(52) U.S. Cl.
  CPC .............. *G06F 3/064* (2013.01); *G06F 3/067* (2013.01); *G06F 3/0608* (2013.01); *G06F 3/0634* (2013.01); *G06F 3/0644* (2013.01); *G06F 3/0661* (2013.01); *G06F 9/4498* (2018.02); *G06F 16/182* (2019.01)

(58) Field of Classification Search
  CPC ...... G06F 3/064; G06F 3/0608; G06F 3/0634; G06F 3/0644; G06F 3/0661; G06F 3/067; G06F 9/4498

USPC .................................................. 711/170, 156
See application file for complete search history.

(56) References Cited

U.S. PATENT DOCUMENTS

| | | | |
|---|---|---|---|
| 7,260,558 B1 * | 8/2007 | Cheng | G06F 16/90344 706/12 |
| 7,596,745 B2 * | 9/2009 | Dignum | G06F 17/2247 715/234 |
| 9,448,965 B2 * | 9/2016 | Brown | G06F 15/7867 |
| 10,430,210 B2 * | 10/2019 | Noyes | G06F 13/1673 |

(Continued)

FOREIGN PATENT DOCUMENTS

| | | | | |
|---|---|---|---|---|
| WO | WO-03023548 A2 * | 3/2003 | | H04L 45/742 |
| WO | WO-03023553 A2 * | 3/2003 | | H04L 29/06 |

*Primary Examiner* — Pierre Miche Bataille
(74) *Attorney, Agent, or Firm* — Cooley LLP

(57) ABSTRACT

The presently disclosed subject matter includes a system and methods to read, write, and distribute large volumes of data based on a finite state machine while maintaining the integrity of data. The system reads and writes records of variable size and stores such records in set of record blocks. Each block from the set of record blocks has a fixed block size and stores an integral number of records. Records are not split among two or more record blocks but instead when there is not enough vacant space to store a record in a current record block the system uses another record block to prevent splitting that record. The format and data transfer protocol implemented by the system enables the storage of large volumes of data in distributed storage devices without compromising data integrity while minimizing computational costs.

19 Claims, 9 Drawing Sheets

(56) References Cited

U.S. PATENT DOCUMENTS

2005/0108571 A1* 5/2005 Lu .......................... G06F 21/34
  726/4
2019/0052553 A1* 2/2019 Subramanian ........ H04L 43/028

* cited by examiner

METHODS AND APPARATUS TO STORE AND ENABLE A TRANSFER PROTOCOL FOR NEW FILE FORMATS FOR DISTRIBUTED PROCESSING AND PRESERVE DATA INTEGRITY THROUGH DISTRIBUTED STORAGE BLOCKS

CROSS-REFERENCE TO RELATED APPLICATION

This application claims priority to and the benefit of U.S. Provisional Patent Application No. 62/510,577 filed May 24, 2017 and titled "METHODS AND APPARATUS TO STORE AND ENABLE NEW FILE FORMATS FOR DISTRIBUTED PROCESSING AND PRESERVE DATA INTEGRITY THROUGH DISTRIBUTED STORAGE BLOCKS," which is incorporated herein by reference in its entirety.

FIELD

At least one embodiment described herein relates generally to the processing of data stored in distributed file systems.

BACKGROUND

Writing and retrieving large volumes of logically-related data into distributed storage systems often involves the execution of additional computation techniques to keep track of sequential data and their interrelationships. Moreover, these additional computation techniques do not guarantee the integrity of data at the time of retrieval because logically-related data like large records often ends up divided into multiple storage blocks, sometimes residing in different storage devices making retrieval of record data a cumbersome process and vulnerable to data corruption.

Thus, a need exists for systems that can ensure data integrity when large volumes of logically-related data are stored in distributed storage devices.

SUMMARY

At least one embodiment described herein addresses the need for systems that read, write, and distribute large volumes of data. In at least one embodiment, an apparatus comprises a processor, and a memory storing code which, when executed by the processor, cause the processor to read from an input data stream, a set of bytes at a first state of a finite state machine, the set of bytes associated with a record. The apparatus transitions from the first state to a second state of the finite state machine when a last byte from the set of bytes read at the first state indicates an enclosing character, and transitions from the first state to a fourth state of the finite state machine when the last byte from the set of bytes read at the first state indicates a record-separator character.

The apparatus reads from the input data stream, a set of bytes at the second state of the finite state machine, the set of bytes at the second state and associated with the record. The apparatus transitions from the second state to a third state of the finite state machine when a last byte from the set of bytes read at the second state indicates the enclosing character.

The apparatus reads from the input data stream, a byte at the third state of the finite state machine, the byte at the third state and associated with the record. In some instances, the apparatus transitions from the third state to the first state of the finite state machine when the byte does not indicate the enclosing character and does not indicate the record-separator character. In some other instances, the apparatus transitions from the third state to the second state of the finite state machine when the byte indicates the enclosing character. In yet some other instances, the apparatus transitions from the third state to the fourth state of the finite state machine when the byte indicates the record-separator character, and writes the record with a value indicative of a size of the record in a data storage device and at the fourth state of the finite state machine.

DETAILED DESCRIPTION

Figure 1:
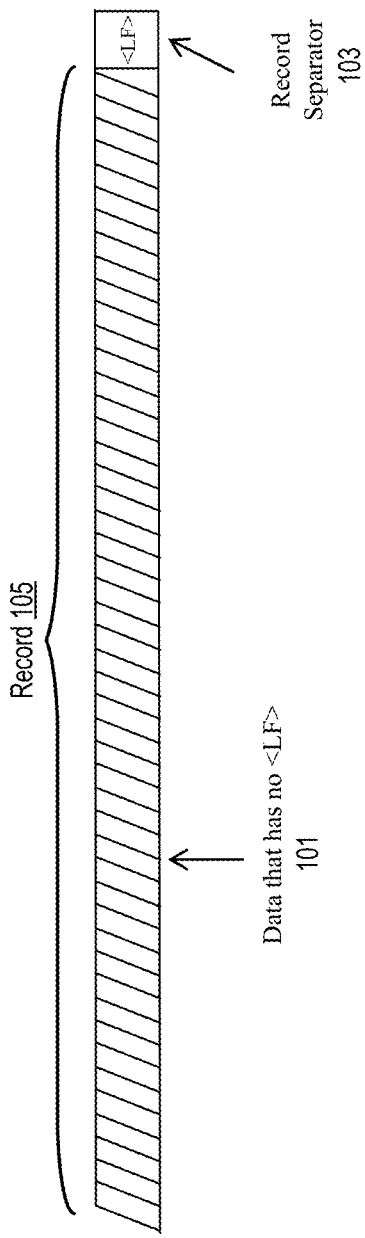
FIG. 1 is an example of record data including a record-separator.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for providing a thorough understanding of the subject technology. It, however, will be clear and apparent that the subject technology is not limited to the specific details set forth herein and may be practiced without these specific details. In some instances, well-known structures and components are shown in block diagram form to avoid obscuring the concepts of the subject technology.

The terms "computer", "processor", "computer processor", "compute device" or the like should be expansively construed to cover any kind of electronic device with data processing capabilities including, by way of non-limiting example, a digital signal processor (DSP), a microcontroller, a field programmable gate array (FPGA), an application specific integrated circuit (ASIC), or any other electronic computing device comprising one or more processors of any kind, or any combination thereof.

As used herein, the phrase "for example," "such as", "for instance" and variants thereof describe non-limiting embodiments of the presently-disclosed subject matter. Reference in the specification to "for example," "such as", "for instance" or variants thereof means that a particular feature, structure or characteristic described in connection with the embodiment(s) is included in at least one embodiment of the presently-disclosed subject matter. Thus the appearance of the phrase "for example," "such as", "for instance" or variants thereof does not necessarily refer to the same embodiment(s).

It is appreciated that, unless specifically stated otherwise, certain features of the presently-disclosed subject matter, which are, for clarity, described in the context of separate embodiments, may also be provided in combination in a single embodiment. Conversely, various features of the presently-disclosed subject matter, which are, for brevity, described in the context of a single embodiment, can also be provided separately or in any suitable sub-combination.

Mainframes enable mission-critical applications throughout enterprises by collecting, generating, and processing large data volumes with high performance and reliability. Mainframes excel in processing transactions using bulk processing capacity at high speeds, having an ability to provide services to large and dispersed networks connected to multiple and diverse compute devices.

Distributed file systems can store data in separate storage block and separate storage devices where it is desired that the data is logically maintained together (e.g., a large file or large record). For instance, a distributed file system can divide and store a single record into two separate storage blocks. These storage blocks can be duplicated and stored sometime in separate repositories. As a result, some storage blocks can contain incomplete or partial records. Reconstructing the full record from record fragments is a cumbersome task if the entire file is not accessed sequentially from beginning to end but instead in a distributed manner. Data integrity impairments may result at the time of retrieving and reconstructing such fragmented records. To facilitate such distributed access, some existing mechanisms convert the data in the records from binary format to somewhat equivalent displayable format. However, in some instances, the conversion of data from binary form to displayable form can potentially affect data integrity and violate data regulations imposed by some jurisdictions. Therefore, a need exists for methods and systems that can take advantage of the functionalities offered by distributed file systems while maintaining high levels of data integrity.

There is an increasing need within the industry to store mainframe files and other files stored in some data warehouses in big data platforms such as Hadoop®, Spark™, and Splunk® to perform data analytics and acquire operational intelligence otherwise dismissed when mainframe data is only stored in repositories with static nature such as disk drives. Retaining mainframe data in Direct Access Storage Devices can be more expensive than retaining such data in big data platforms. While storing data in magnetic tapes remains an affordable solution data stored in such tapes suffers from data accessibility and analysis limitations.

Even though there are multiple incentives to store mainframe data in big data platforms and distributed file systems, technical issues often arise when these platforms/systems ingest mainframe files. Such technical issues include data bottlenecks, inability to process mainframe files with variable length records, loss of metadata contained in mainframe files during data conversion from a mainframe format to a third-party format, and other similar issues that can affect the integrity of data. In some instances, these issues can be exacerbated by file formats used by mainframes and other compute devices. For example, mainframes or other compute devices can produce files with variable record length. This means that each record in the file can have a different number of bytes, up to a set maximum length. For another example, mainframes or other compute devices can produce files having dedicated record delimiters such as line feed characters or other suitable characters, which can sometimes have a semantic meaning that is part of the data itself instead of functioning as a record-separator or delimiter. Files in the aforementioned formats are typically not suitable for distributed storage systems, because they do not lend themselves to the existing division and distribution processes executed by distributed storage systems. Distributed storage systems often handle data in formats that define data according to a fixed length or fixed memory size thus are often unsuitable to handle files with variable record length. A new file format and data distribution protocol is discussed below with reference to FIGS. 5-9, improved for data processes at distributed file systems while maintaining data integrity. Limitations of using some known file formats (for instance, file formats with reference to FIG. 2 and FIG. 4) are discussed followed by processes to generate a retrieve a new file format discussed shown in FIG. 7.

Figure 6:
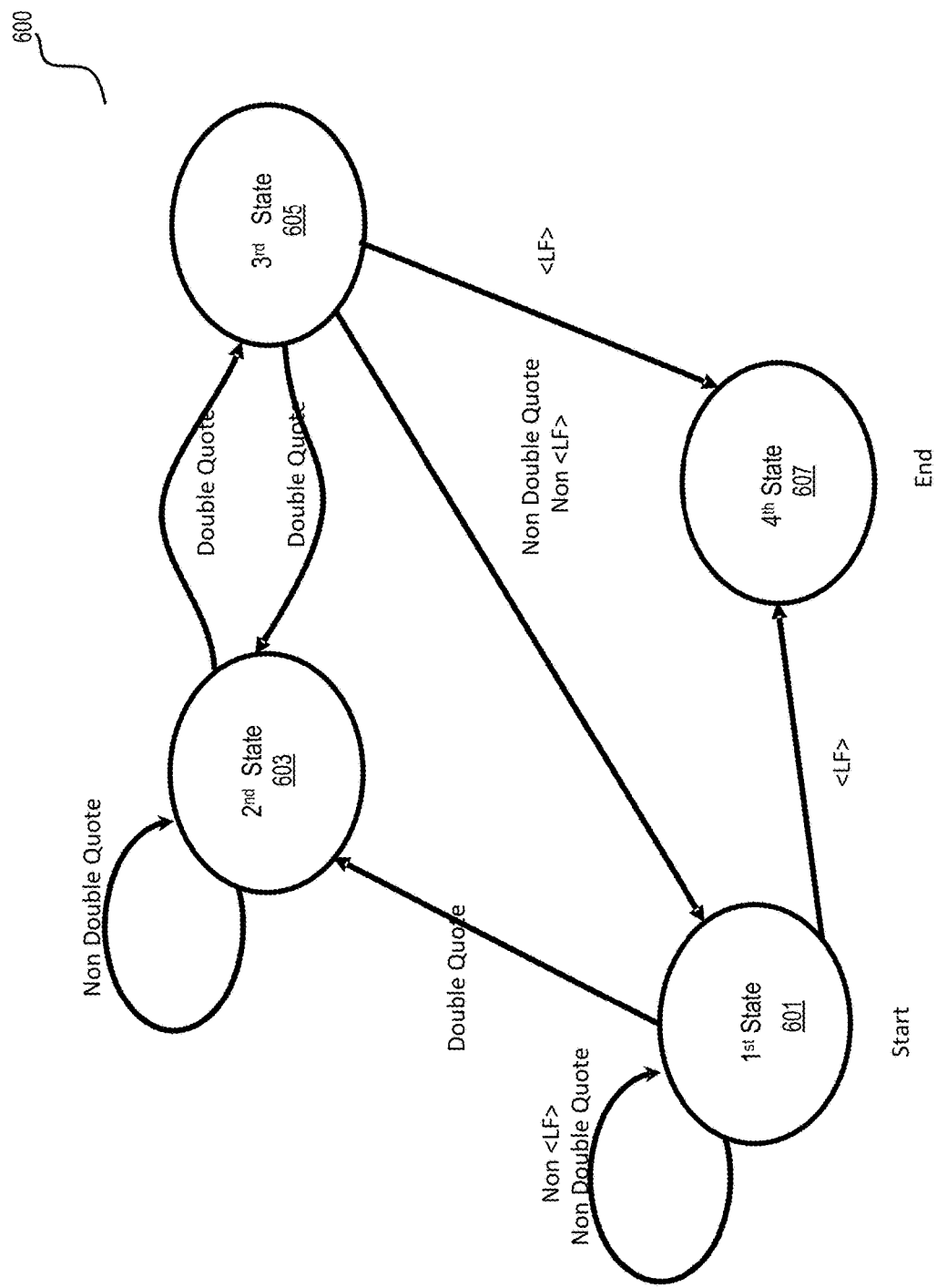
FIG. 6 is an example of a finite state automaton for the identification of records, according to an embodiment.
Figure 7:
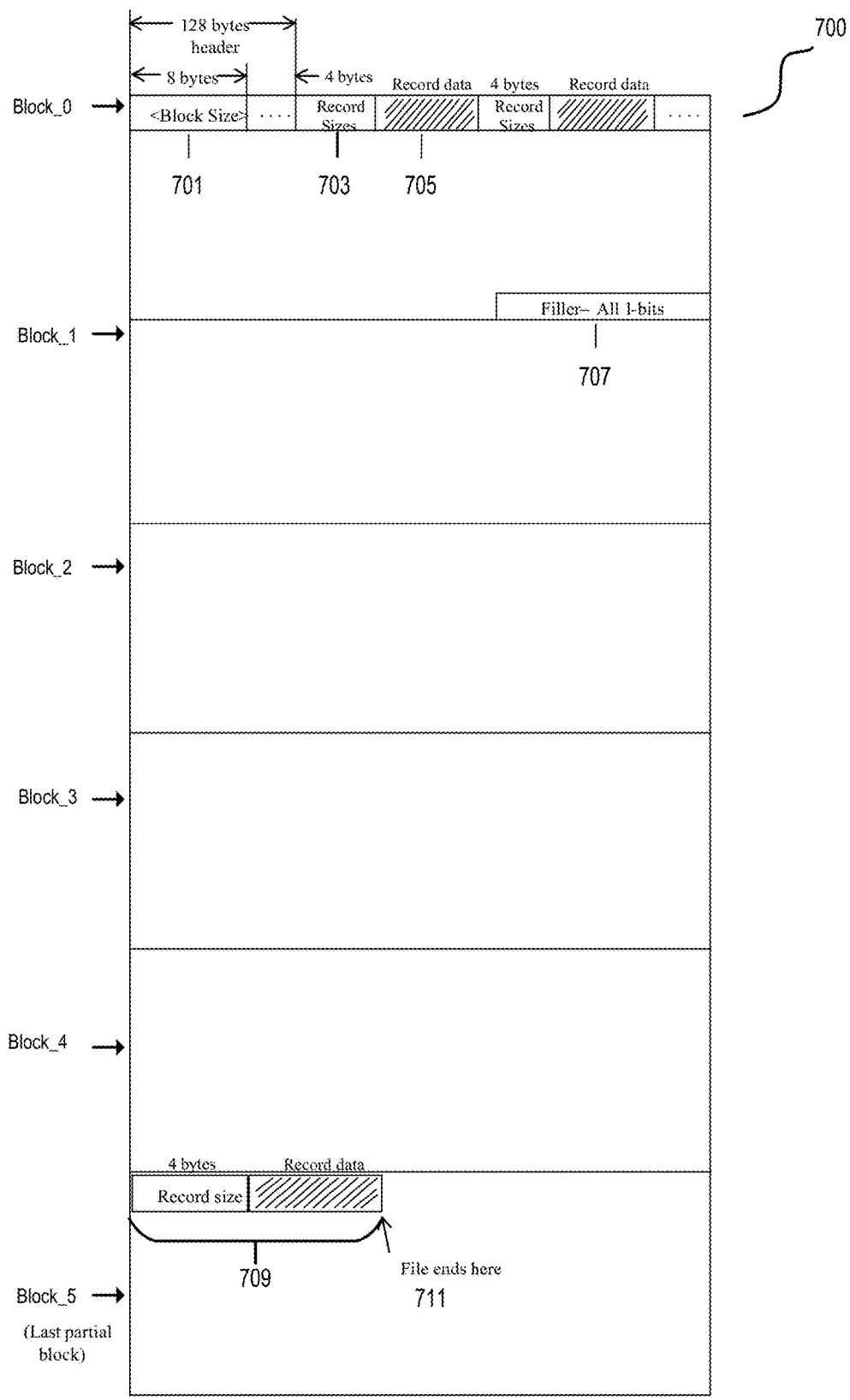
FIG. 7 is an example of a file logically divided into record blocks, each record block having an integral number of records, according to an embodiment.

In some implementations, processes to generate the file format shown in FIG. 7, (i.e., processes discussed with reference to FIG. 5, FIG. 6 and FIG. 8) can be executed by, for example, a compute device that is part of or is coupled to a distributed file system. In some other alternative implementations, these processes can be executed by a compute device prior delivering a file (e.g., process shown in FIG. 5 and FIG. 6) and during or after receiving a file (e.g., process shown in FIG. 8) from a distributed file system. Some examples presented below are discussed in the context of files produced by mainframe systems however; other suitable compute devices can analogously produce such files.

In some instances, a mainframe can produce large files of a size in the order of terabytes and beyond. Such files often include data organized or arranged as a mix of records of variable and constant size. In some instances, when mainframes transfer files including records of variable size to other systems, the files are sent in a format that uses special characters, for instance, line feed (<LF>), carriage return (<CR>) or other suitable characters to separate two or more records within a file. FIG. 1 is an example illustrating record 105 where the segment filled with a pattern of diagonal lines 101 represents data, and the line feed <LF> character 103 serves as a record-separator to indicate the end of record 105.

Figure 2:
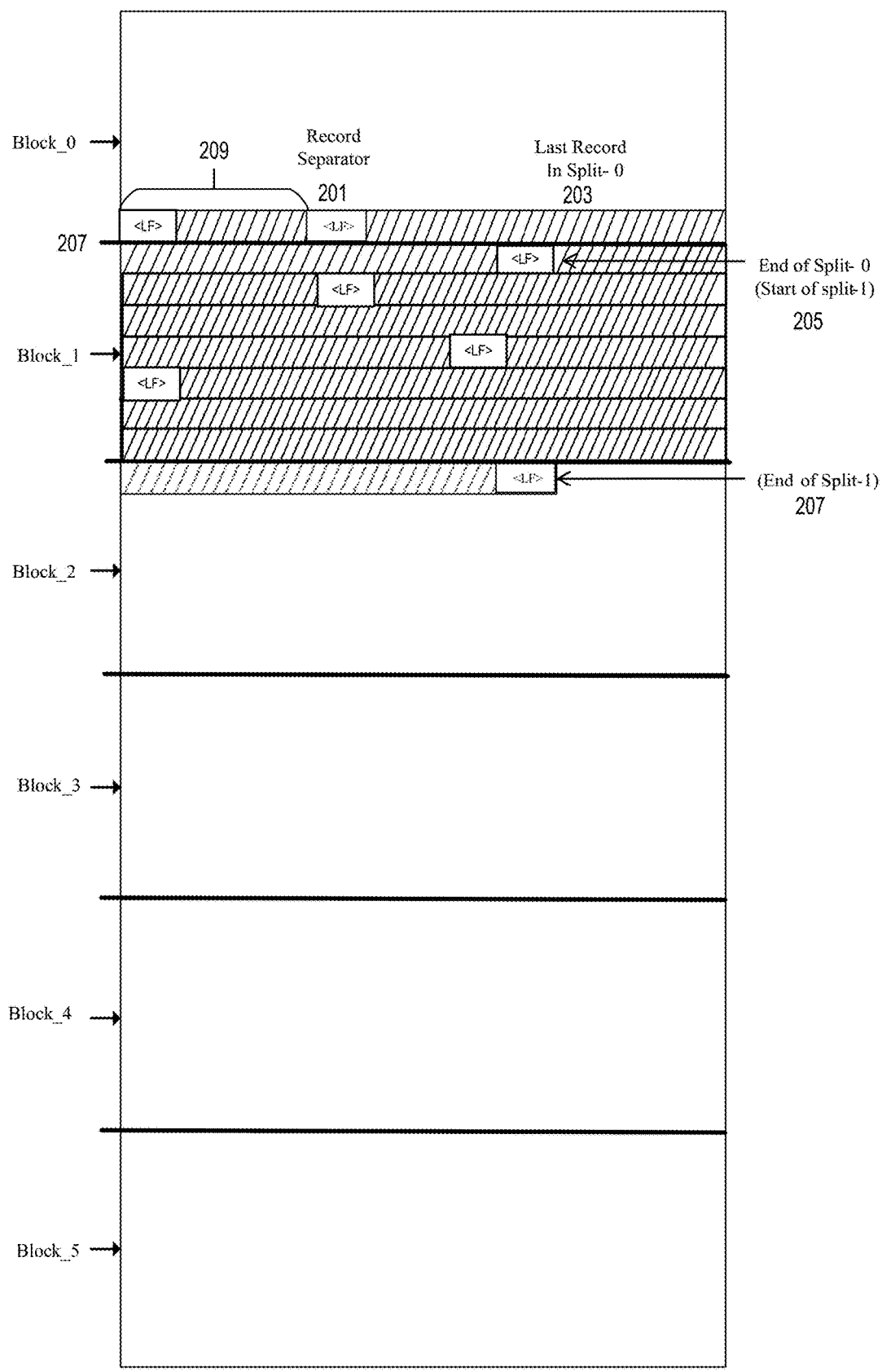
FIG. 2 is an example of a file including fragmented or partial records residing across multiple storage blocks.

As discussed above, it is desirable to store mainframe files in distributed file systems to take advantage of parallel processing provided by such systems. In some instances, it is desirable to perform analytics on data included in mainframe files via analytics platforms or tools having distributed file systems operating at their backend. FIG. 2 shows an example of records divided in multiple storage blocks. It is noted that although Block 0, Block 1, . . . , and Block 5 are shown in FIG. 2 as part of a single storage device, these blocks can alternatively reside in different storage devices. The records shown in FIG. 2 are similar to the record 105 discussed with reference to FIG. 1. In some instances, boundaries defining a storage block can divide a single record into two separate storage blocks. In such cases, further processing is typically performed to ensure that each split of data contains an integral number of records or in other words to ensure that no records are split between two splits. For instance, boundary 207 (located between Block-0 and Block-1) divides record 203, which starts after record separator 201 and ends at record separator 205. This case is typically handled by executing a scanning function. Such a scanning function reads all record data after boundary 207 until record separator 205 is identified or encountered. At this point, a first split (e.g., Split-0) is produced. Split 0 includes the complete last record 203 and other preceding records or variable size for instance, record 209 (if any). Split-1 includes all the records after record separator 205 until record separator 207. Each time a record is divided by a block boundary, a distributed file system handling such a record incurs in some computational overhead to ensure integrity of record data.

Figure 3:
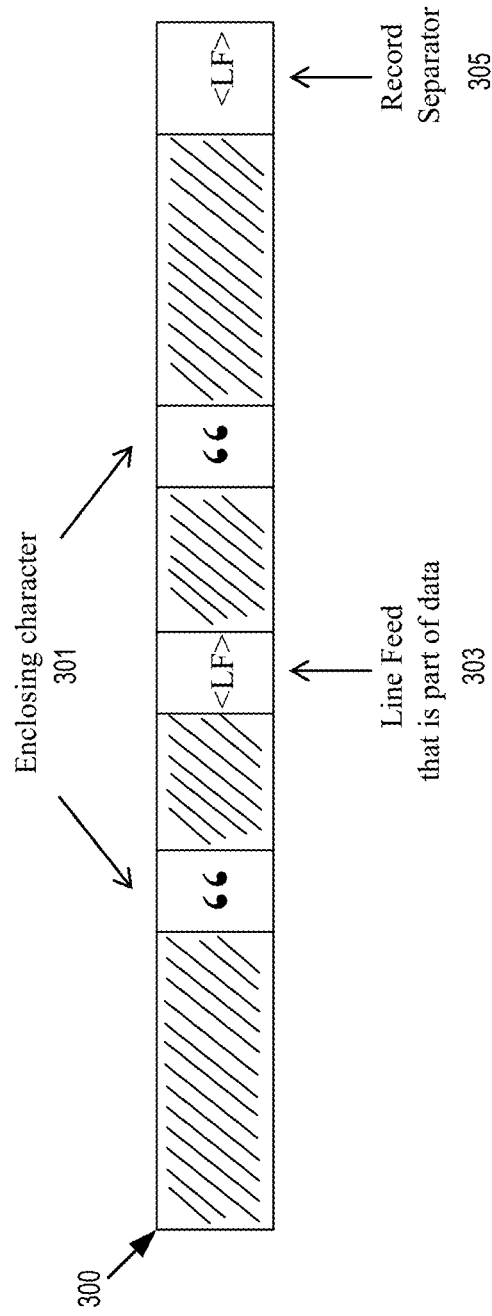
FIG. 3 is an example of a record including a separator character confined by a pair of enclosing characters.

In some instances, characters or symbols such as <LF> and <CR> often used as record separators can be part of the data included in a record and can have a semantic meaning and should not be interpreted as a record separator. Thus, distributed file systems or other compute devices often perform further computations just to identify those characters meant to serve as record separators and other characters meant to convey a semantic meaning. For example, in some instances a line feed character <LF> can indicate the end of a record while in other instances the line feed character <LF> can be part of the data included in the record. FIG. 3 illustrates a record with two line feed characters <LF>. Line feed character 305 is a record separator and thus, indicates the end of record 300. Line feed character 303 is part of the record's data and thus, should not be interpreted as a record separator. When line feed characters such as <LF> 303 are not meant to serve as record separators, they are typically confined by a pair of enclosing characters 301, in this instance, a pair of double quote characters. The pair of enclosing characters 301 can be used by a scanning function operating on a file to distinguish identical characters that are sometimes meant to function as record separators and sometimes not. Pairs of enclosing characters such as 301 are typically generated by, for example, database dump utilities and other suitable applications.

Processing files with records as the one discussed with reference to FIG. 3 can result in erroneous determinations on whether a character should be interpreted as a record separator or not. For instance, in the file shown in FIG. 4 character 401 may or may not denote a first enclosing character of a pair of enclosing characters. A scanning function can encounter character 401 but cannot determine if such a character should be interpreted as an enclosing character or not. The scanning function would have to keep reading data until the encounter of <LF> character 403 followed by a second enclosing character 405 of a pair of enclosing characters. Upon the encounter of the second enclosing character 405, the scanning function can determine that <LF> character 403 should not be interpreted as a record separator because the pair of enclosing characters 401 and 405 enclose it. Likewise, the scanning function incurs in some computational overhead to determine that the <LF> character 407 is a record separator and use it as the boundary of Split 0.

In some instances however, the encounter of characters 401, 403, and 405 (in that order) is not sufficient to determine whether the character <LF> 403 is a record separator. For example, character 401 can be a singleton (not paired) character not meant to function as an enclosing character for <LF> 403; in such a case, <LF> character 403 should be interpreted as a record separator and the boundary of Split 0. Thus, records such as the one illustrated in FIG. 3 add a level of unreliability to scanning functions meant to determine splits with integral number of records.

Figure 4:
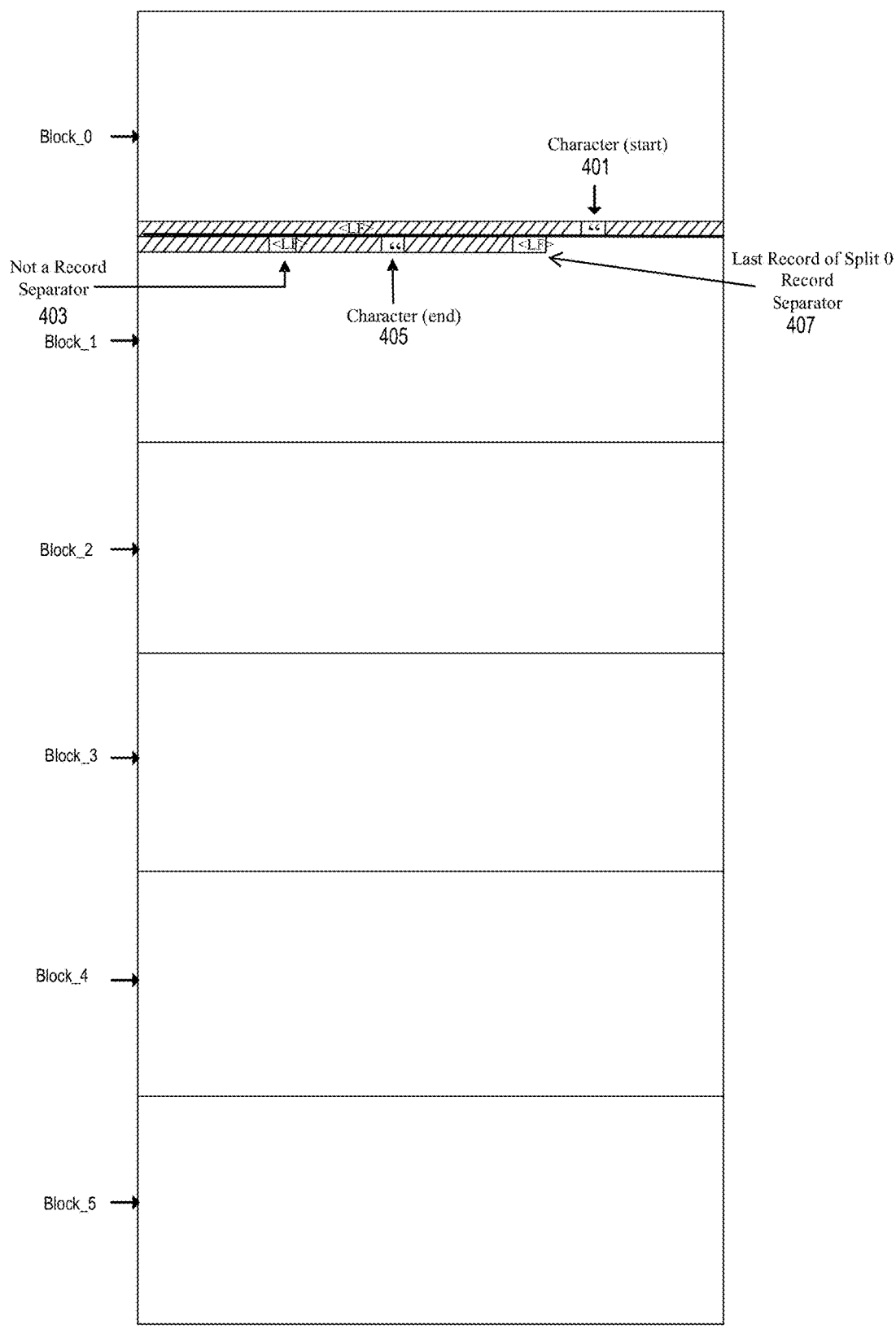
FIG. 4 is an example of a file including fragmented or partial records with a separator character confined by a pair of enclosing characters.
Figure 5:
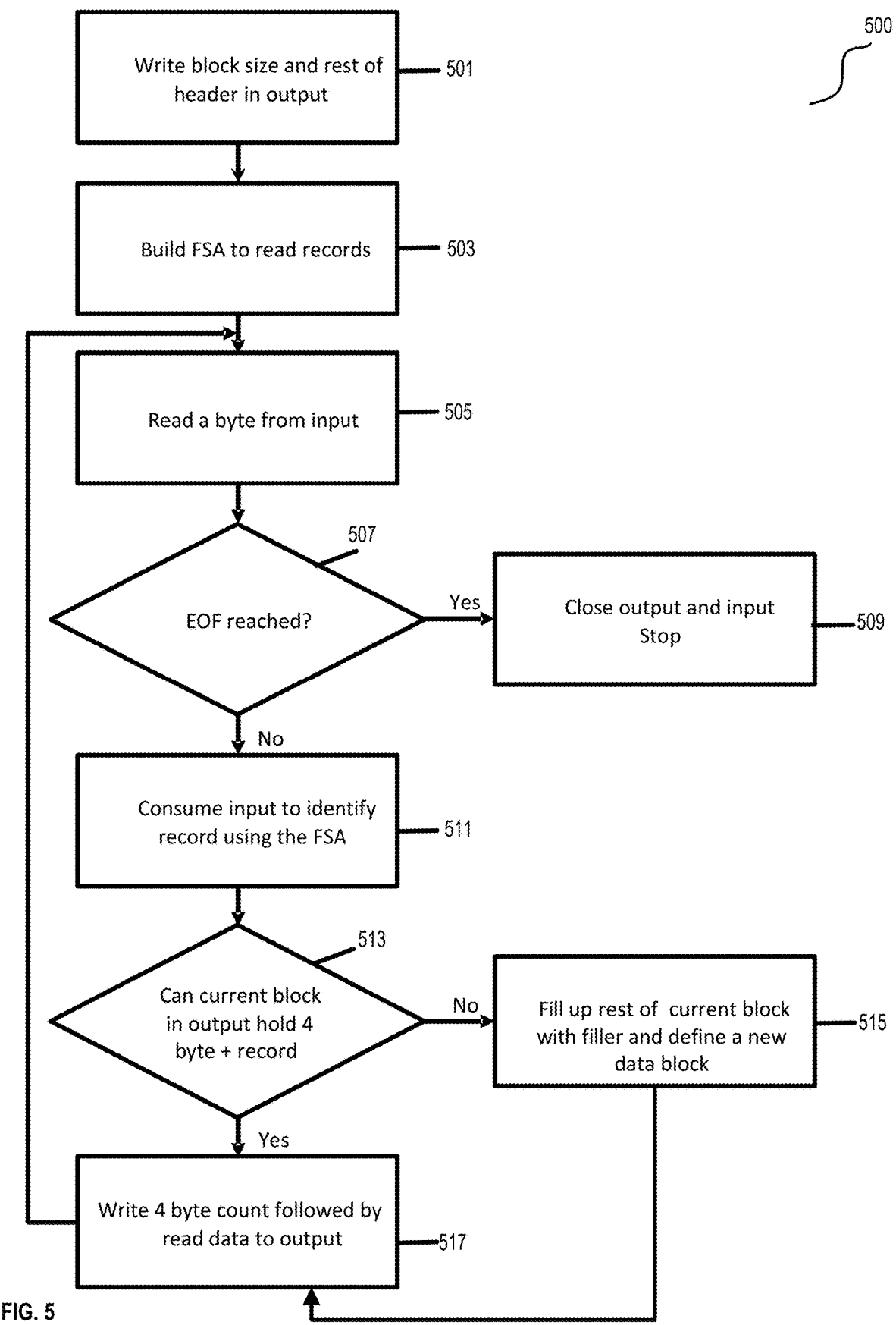
FIG. 5 is a flowchart for writing a file including multiple record blocks with integral numbers of records, according to some embodiments.

Process 500 illustrated in FIG. 5 can be used to produce a file in an improved format including metadata used to overcome computational overhead and unreliability resulting from the execution of scanning functions such as the ones described with reference to FIG. 2 and FIG. 4. Process 500 can be implemented at a node compute device part of distributed file systems, cloud-based systems or other suitable distributed storage systems. Alternatively, process 500 can be implemented by a compute device that generates large files meant to be processed by distributed file systems, cloud-based systems, or other suitable distributed storage systems. At 501, a header with metadata indicating the block size of the record blocks is injected to an output file. The record block size included in the header indicates that all the data associated with a record computed through the process 500 will be written in a single record block as opposed to be spanned over more than one record block. A finite state automaton ("FSA") is built at 503 to process records that will be included in the produced output file. An example of an FSA is further discussed below with reference to FIG. 6. Thereafter, a loop or iterative control structure is initiated at 505 in which bytes are read from an input source and then written into an output record block that is part of the output file being produced. Conditional statement 507 determines if the byte read at 503 indicates an end of file (EOF) or the end of an input data stream. If EOF or end of the input data stream is reached, an output file is generated at 509. Such an output file is logically divided into record blocks of the size indicated at 501. Each record block in the output file has an integral number of records i.e., no partial records are included in any of the defined record block.

If at 507 it is determined that the EOF or end of the input data stream was not reached, the byte read at 505 is consumed at 511 for the identification of record data using the FSA built at 503. Thereafter, conditional statement 513 is executed to determine if the record block being used by process 500 can hold a record identified at 511 and an associated four-byte prefix. In other words, determine if such the record block has enough vacant space to store the whole record and the associated four-byte prefix. If it is determined at 513 that the current record block does not have enough vacant space, the remainder of the record block is filled at 515 with a sequence of filler bytes or padding characters and a new record block is defined. Thereafter, a four-byte prefix is written to the new record block indicating the size of the record followed by the identified record as shown at 517. If it is determined at 513 that a current record block can hold an identified record with a four-byte prefix then, the prefix indicating the length of the identified records and the record data are written at 517 into the record block. Thereafter, a new iteration of the loop or control structure begins at 505.

In some implementations, a compute device (e.g., a mainframe or server) can read large volumes of data from an input data stream. The compute device can define a file in a storage device to write data read from the input data stream. The file can include a header that specifies a value indicative of a fixed block size for a set of record blocks used to store data in the file. The compute device can implement and use a finite state machine configured to read data from the input data stream and write data to the file. For instance, the compute device can implement and initiate an iterative reading and writing process based on an iterative control data structure as the one shown in FIG. 5, The control data structure can be associated with a termination condition and can be configured to execute at each iteration of the iterative reading and writing process reading and writing operations. For example, reading a set of bytes from the input data stream based on a set of reading states of the finite state machine can be performed at each iteration. For another example, writing a record with a value indicative of a record size into a record block from the set of record blocks based on a writing state of the finite state machine in response to the most recently read byte corresponding to a predetermined value (e.g., an indicator of a record separator) can be performed at each iteration. The control data structure can be configured to terminate the iterative reading and writing process in response to the termination condition of the iterative control data structure being met. For instance, the termination condition can be a character or other data indicating the end of the input data stream, thereafter the compute device can close the file in the storage device. It is appreciated that the process discussed above is described with reference to one storage device however, the file can be stored in more than one storage device (e.g., the file can be stored in multiple and separate storage device.

An example of a FSA that can be used as part of process 500 is discussed with reference to FIG. 6. The FSA shown in FIG. 6 can be built for example, in a mainframe or other compute device reading and writing large files. For instance, FSA can be built in mainframe 100 (shown in FIG. 9), a compute device coupled to mainframe 100, or other suitable compute device. At the first state 601, the FSA consumes bytes from an input source. The FSA verifies each of the consumed bytes. As long as the most recently consumed byte, (last consumed byte) is not an <LF> character or a double quote character, the FSA remains consuming bytes at the first state 601. If the most recently consumed byte, (last consumed byte) is a double quote character, FSA transitions to the second state 603. Likewise, if the most recently consumed byte, (last consumed byte) is a <LF> character, FSA transitions to the fourth state 607 and there the FSA ends.

At the second state 603, FSA keeps consuming bytes from the input source. As long as most recently consumed byte, (last consumed byte) does not indicates a double quote characters the FSA remains in the second state 603. If however, the most recently consumed byte, (last consumed byte) indicates a double quote character then, FSA 600 transitions to the third state 605. At the third state 605, FSA consumes just one byte. If the consumed byte indicates a double quote character, FSA transitions back to the second state 603. If the consumed byte is not a double quote character and not an <LF> character then the FSA transitions back to first state 601. If the consumed byte is a <LF> character then the FSA transitions to the fourth state 607 and there the FSA ends. At the fourth state 607, the FSA has consumed all the bytes contained in a single record. It is appreciated that the FSA can unambiguously determine whether an <LF> should be interpreted as a record separator or not by verifying if consumed bytes correspond to enclosing characters. In this instance, enclosing characters are represented by double quotes as discussed above with reference to FIG. 3. Note however, that other types of record separators different from <LF>, enclosing characters different from double quote, and states can be similarly used in an FSA.

An example of an output file produced by process 500 and FSA 600 is illustrated in FIG. 7. Output file 700 includes six record blocks, each record block includes an integral number of records. Records can be of variable size, any remaining space in a given block that is not big enough to contain a subsequent record (and a four-byte prefix) is filled with a filler byte for instance, a sequence of common bits shown at 707. Header 701 contains metadata including eight bytes specified in big-endian order indicating the size of the record blocks included in output file 700. Each record begins with a four-byte prefix indicating the length of a subsequent record. Record prefixes can be denoted in big-endian order to convey a signed integral number. For instance, prefix 703 indicates the length of record 705. Prefixes with a negative numbers can be used to indicate that subsequent data is not record data, but instead is a sequence of filler bytes.

In some instances, when the last record in an output file do not use the full storage capacity of a last record block, the remaining space of the last block does not need to be filled with a sequence of filler bytes. For instance, record 709 is the last record in output file 700 where the file ends at file location 711, and the rest of Block 5 does not include a sequence of filler bytes.

Figure 8:
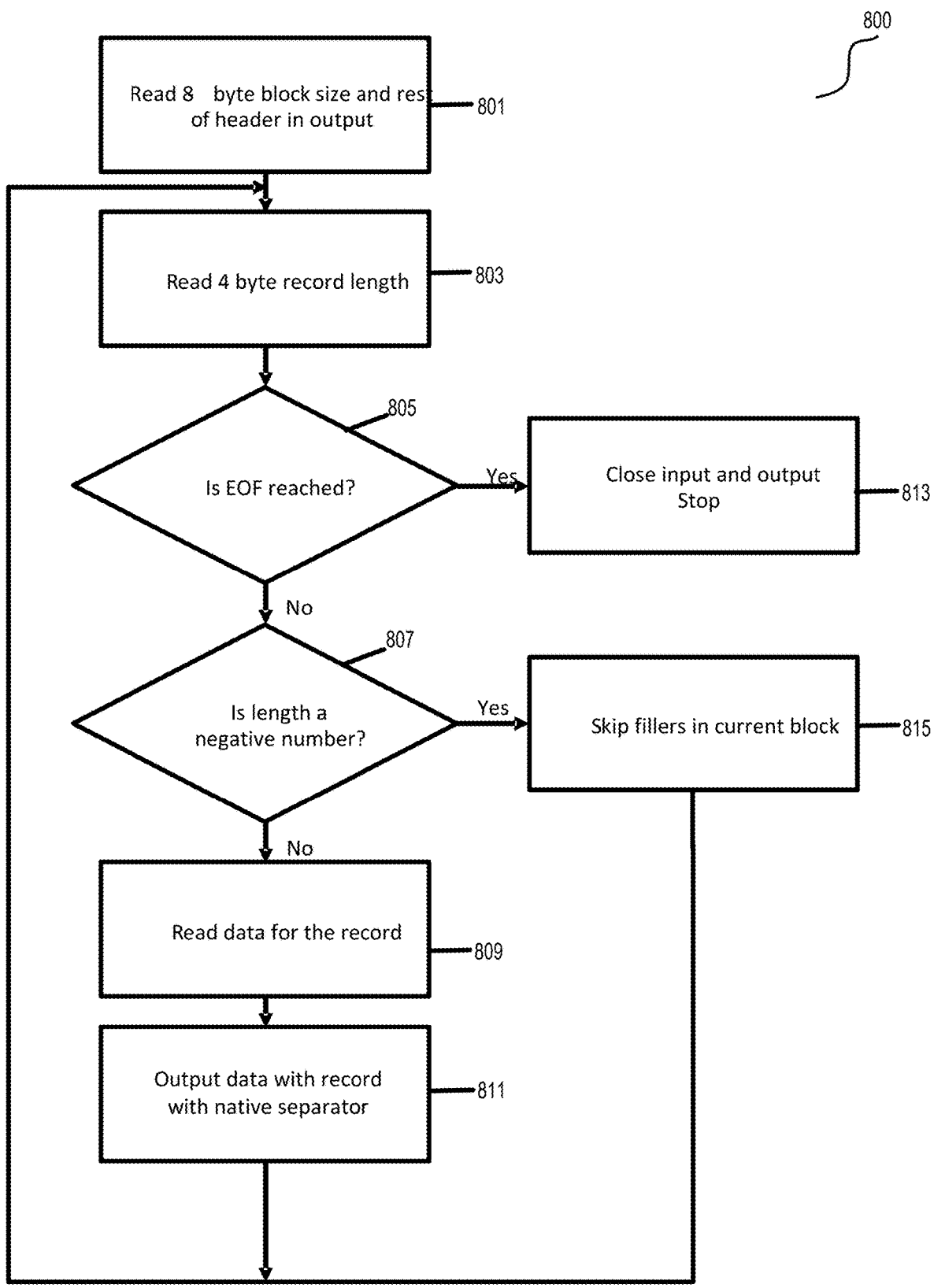
FIG. 8 is a flowchart for retrieving a file with multiple records from a distributed file system, according to some embodiments.

An example of a process to retrieve a file (such the one shown in FIG.) from a distributed file system is discussed with reference to FIG. 8. Process 800 can be implemented at a compute device or node that is part of distributed file systems, cloud-based systems or other suitable distributed storage systems. Alternatively, process 800 can be implemented by a compute device that generates large files meant to be processed by distributed file systems, cloud-based systems or other suitable distributed storage systems. Process 800 reads at 801 a block size and other suitable metadata included in a file's header. Thereafter, a loop or iterative control structure is initiated at 803 in which record prefixes (e.g., of four-byte length) are read. Conditional statement 805 is executed to determine if the end of the file has been reached. If the end of the file is reached then, all of the file's content has been retrieved and thus, any input and output interfaces can be closed and the process ends at 813. If the end of the file was not reached then, conditional statement 807 is executed to determine if the bytes of the four-byte prefix read (e.g., at 803) indicate a negative number. As discussed above, in some instances record prefixes can denote a negative number to indicate that the subsequent data is not record data, but instead is a sequence of filler bytes. In such a case, the sequence of filler bytes are disregarded or skipped at 815. If it is determined at conditional statement 807 that the bytes of the four-byte prefix read (e.g., at 803) do not indicate a negative number, then record data is retrieved or read at 809. The amount of record data read at 809 corresponds to the record length indicated in the record's prefix read at 803. Thereafter the record read at 809 is written into an output file with a record separator at 811, and a new iteration of the loop or control data structure begins at 803.

In some implementations, a compute device (e.g., a mainframe or a server) can read files stored via the process and the finite state machine discussed above with reference to FIG. 5 and FIG. 6 respectively. Such files follow a format as the one discussed with reference to FIG. 7. Accordingly, a compute device can determine a record block size based on a header included in a file. The compute device can initiate an iterative reading process based on an iterative control data structure associated with a termination condition. The compute device can execute one or more reading operations at each iteration of the iterative reading process. For instance, the compute device can read from a first record block from a set of record blocks used to store data contained in the file, a first record value indicative of a record size. The compute device can also read from the first record block, record data in response to the first record value correlating with a natural number, (i.e., a positive integer number). In some instances, when the first record value does not correlate with a natural number then, the compute device reads from a second record block from the set of record blocks used to store data in the file, a second record value indicative of a record size and reads from the second record block, record data in response to the second record value correlating with the natural number. The compute device can terminate the iterative reading process when the termination condition of the iterative control data structure is met, e.g., when an end of file character is read. Thereafter, the compute device can send the record data read during the iterative reading process to a destination compute device.

Figure 9:
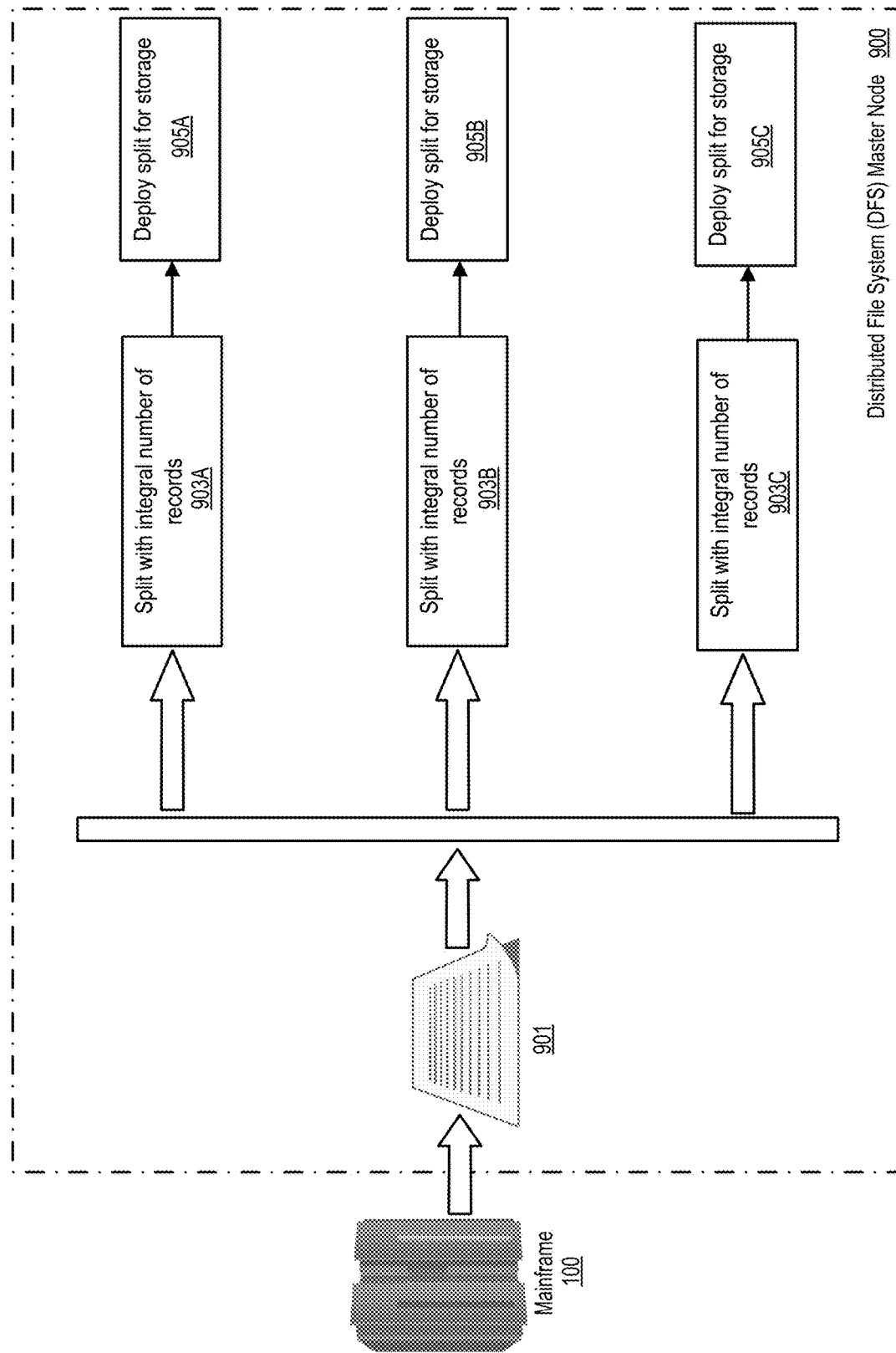
FIG. 9 is a block diagram illustrating parallel processing of a file logically divided into record blocks with integral number of records, according to an embodiment.

In some implementations, mainframe 100 can be coupled to a master node 900 of a distributed file system ("DFS") (e.g., master node shown in FIG. 9). Master node 900 is a server or other suitable compute device that manages and runs parallel computations on a cluster of worker nodes. Master node 900 manages a cluster of servers or worker nodes for the distributed storage of data. Master node 900 can be, for example, part of a distributed file or storage system, or a suitable big data platforms or systems. In the example shown in FIG. 9, mainframe 100 produces file 901. File 901 has a similar format and structure as the file discussed with reference to FIG. 7.

Master node 900 receives and parallelizes the ingestion of file 901. In some instances, master node 900 extracts the file's header to determine a record block size used throughout file 901. In some instances, master node 900 determines whether file 901 can be divided in record blocks of a size that is multiple or a factor of the size of storage blocks used by a DFS. For instance, if file 901 was configured to be divided into record blocks of 128 MB, and the DFS is configured to operate using storage blocks that are multiple of 64 MB, then master node 900 can divide file 901 in splits of 128 MB. In this instance, each of the splits 903A, 903B, and 903C have a size of 128 MB as defined in file 901. In some implementations, master node 900 deploys, at 905A, 905B, and 905C the determined splits to a cluster of worker nodes to process such that the resulting data from processing each split is stored in a storage block in DFS.

The format and metadata in file 901 enables master node 900 to divide data content into splits of common size, while ensuring that each split has an integral number of records. In this instance, master node 900 does not have to implement a scanning function such as the ones discussed in FIG. 2 and FIG. 4. Thus, the fragmentation of mainframe records is efficiently preempted.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

It is intended that the systems and methods described herein can be performed by software (stored in memory and/or executed on hardware), hardware, or a combination thereof. Hardware modules may include, for example, a general-purpose processor, a field programmable gates array (FPGA), and/or an application specific integrated circuit (ASIC). Software modules (executed on hardware) can be expressed in a variety of software languages (e.g., computer code), including Unix utilities, C, C++, Java™, JavaScript, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

The invention claimed is:

1. An apparatus, comprising:
   a processor, and
   a memory storing code which, when executed by the processor, cause the processor to:
   read, at a first state of a finite state machine, from a set of bytes from an input data stream, the set of bytes associated with a record,
   transition the finite state machine from the first state to a second state when a first byte from the set of bytes read by the finite state machine in the first state indicates an enclosing character; and
   transition the finite state machine from the first state to a fourth state when the first byte indicates a record-separator character;
   read, at the second state of the finite state machine, from the set of bytes from the input data stream,
   transition the finite state machine from the second state to a third state when a second byte from the set of bytes read by the finite state machine in the second state indicates the enclosing character;
   read, at the third state of the finite state machine, from the set of bytes from the input data stream, transition the finite state machine from the third state to the first state when a third byte from the set of bytes read by the finite state machine in the third state does not indicate the enclosing character and does not indicate the record-separator character, transition the finite state machine from the third state to the second state when the third byte indicates the enclosing character, transition the finite state machine from the third state to the fourth state when the third byte indicates the record-separator character, and write, at the fourth state of the finite state machine, the record into a output file, the output file including a value indicative of a size of the record.

2. The apparatus of claim 1, wherein the code to write the record includes code to:
write the record into the output file in a single record block.

3. The apparatus of claim 1, wherein the code to write the record includes code to:
write the record into the output file in a single record block, the output file logically divided into a set of record blocks, each record block from the set of record blocks having an integral number of records.

4. The apparatus of claim 1, wherein the code to write the record includes code to:
write the record into a first record block of the output file when the first record block has vacant space to store the record; and
when the first record block does not have vacant space to store the record:
define a second record block in the output file; and
write the record, including the value indicative of the size of the record, into the second record block.

5. The apparatus of claim 1, wherein the code to write the record includes code to:
write the record into a first record block defined in a first data storage device when the first record block has vacant space to store the record; and
when the first record block does not have vacant space to store the record:
define a second record block in a second data storage device; and
write the record, including the value indicative of the size of the record, into the second record block.

6. The apparatus of claim 1, wherein the code to write the record includes code to:
write the record into a first record block defined in a first data storage device when the first record block has vacant space to store the record; and
when the first record block does not have vacant space to store the record:
fill a remainder of the first record block with a padding character;
define a second record block in a second data storage device; and
write the record, including the value indicative of the size of the record, into the second record block.

7. The apparatus of claim 1, wherein the third byte indicates the record-separator character and the code includes code to further cause the processor to:
read a fourth byte from the input data stream, the fourth byte immediately after the third byte in the input data stream;
transition the finite state machine to the first state of the finite state machine when the fourth byte indicates a character different from an end of file character.

8. The apparatus of claim 1, wherein the record is from a set of records, the third byte indicates the record-separator character, and the code includes code to further cause the processor to:
read a fourth byte from the input data stream, the fourth byte immediately after the third byte in the input data stream,
transition the finite state machine to the first state when the fourth byte indicates a character different from an end of file character; and
when the fourth byte indicates a character indicative of an end of file:
close the output file, the output file logically divided into a set of record blocks, each record block from the set of record blocks having an integral number of records from the set of records, the record from the set of records stored in one record block from the set of record blocks.

9. The apparatus of claim 1, wherein the value indicative of the size of the record is denoted in big-endian order and is indicative of an integral number.

10. The apparatus of claim 1, wherein the value indicative of the size of the record is denoted in big-endian order and represents a negative integral number when a data succeeding the value indicative of the size of the record correspond to padding characters.

11. An apparatus, comprising
a processor, and
a memory storing code which, when executed by the processor, cause the processor to:
initiate an iterative reading process based on an iterative control data structure associated with a termination condition, each iteration of the iterative reading process including
reading from a first record block from a set of record blocks storing data of a file, a first record value indicative of a record size;
reading from the first record block, record data in response to the first record value correlating with a natural number; and
in response to the first record value not correlating with a natural number:
reading from a second record block from the set of record blocks used to store data in the file, a second record value indicative of a record size; and
reading from the second record block, record data in response to the second record value correlating with the natural number;
terminate the iterative reading process when the termination condition of the iterative control data structure is met; and
send the file read during the iterative reading process to a compute device.

12. The apparatus of claim 11, wherein the termination condition is met when a value read from a record block from the set of record blocks used to stored data in the file indicates an end of file.

13. The apparatus of claim 11, wherein a record separator is inserted into the read record data each time a record in the record data ends.

14. The apparatus of claim 11, wherein padding data included in the set of record blocks used to store data in the file is not read by the processor.

15. A method comprising:

defining a file in a data storage device, via a processor, the file including a header having a value indicative of a fixed block size for a set of record blocks used to store data in the file;

building a finite state machine configured to read data from an input data stream and write data to the file;

initiating an iterative reading and writing process based on an iterative control data structure associated with a termination condition, each iteration of the iterative reading and writing process includes:

reading a set of bytes from the input data stream based on a set of reading states of the finite state machine; and writing a record with a value indicative of a record size into a record block from the set of record blocks based on a writing state of the finite state machine in response to the most recently read byte corresponding to a predetermined value;

terminating the iterative reading and writing process in response to the termination condition of the iterative control data structure being met; and closing the file in the storage device.

16. The method of claim 15, wherein the record block is a first record block and each iteration of the iterative reading and writing process further includes:

writing the record with the value indicative of the record size in the first record block in response to the first record block having vacant space to store the record with the value indicative of the record size; and including a second record block to the set of record block used to store data in the file in response to the first record block not having vacant space to store the record with the value indicative of the record size; and writing the record with the value indicative of the record size in the second record block.

17. The method of claim 15, wherein each record block from the set of record blocks used to store data in the file includes an integral number of records and has a block size corresponding to the fixed block size.

18. The method of claim 15, wherein the termination condition correlates with a character that indicates an end of data from the input data stream.

19. The method of claim 15, wherein the storage device is included within a group of multiple storage devices, the set of record blocks used to store data in the file is distributed among the multiple storage devices, and each record block from the set of record blocks includes an integral number of records.

* * * * *